US006472469B2

(12) United States Patent
Bristol et al.

(10) Patent No.: US 6,472,469 B2
(45) Date of Patent: Oct. 29, 2002

(54) FIBERGLASS BINDERS

(75) Inventors: Derek C. Bristol, Boulder, CO (US); Thomas J. Taylor, Englewood, CO (US); Steven D. Dawson, Denver, CO (US)

(73) Assignee: Johns Manville International, Inc., Denver, CO (US)

( * ) Notice: Subject to any disclaimer, the term of this patent is extended or adjusted under 35 U.S.C. 154(b) by 0 days.

(21) Appl. No.: 09/811,223

(22) Filed: Mar. 16, 2001

(65) Prior Publication Data

US 2001/0036996 A1 Nov. 1, 2001

Related U.S. Application Data

(60) Provisional application No. 60/163,479, filed on Nov. 3, 1999.

(51) Int. Cl.⁷ .............................................. C08L 83/60
(52) U.S. Cl. ..................................................... 524/841
(58) Field of Search ......................................... 524/841

(56) References Cited

U.S. PATENT DOCUMENTS 5,371,140 A * 12/1994 Parks ....................... 525/54.42

* cited by examiner

*Primary Examiner*—Edward J. Cain
(74) *Attorney, Agent, or Firm*—Robert K. Touslee

(57) ABSTRACT

Using urea extended phenolic binders with a resin to urea solids ratio below 60/40 can significantly reduce production costs in the manufacture of fiberglass products without adversely affecting product performance or producing formaldehyde or ammonia emissions at unacceptable levels. The phenolic binders are produced by reacting urea with phenolic resins that are prepared in a reaction in which the formaldehyde and phenol are initially present in mole ratios of greater than 3.75:1. In preparing the phenol/formaldehyde based binder, the molar ratio of free formaldehyde to urea must be carefully controlled in order to minimize emissions of ammonia and formaldehyde. Typically this molar ratio is kept between 0.8 and 1.0, therefore, higher free formaldehyde resins may be reacted with a higher percentage of urea to maintain the target formaldehyde to urea molar ratio. No ammonia is needed in the making the phenolic binder.

11 Claims, 3 Drawing Sheets

Tetradimer

FIBERGLASS BINDERS

This application claims benefit of Provisional Application Ser. No. 60/163,479 filed Nov. 3, 1999.

FIELD OF THE INVENTION

This invention relates to a phenolic resin composition useful for preparing fiberglass insulation. The present invention particularly relates to phenolic resins having formaldehyde to phenol molar ratios of greater than 3.75:1. These resins are used to fabricate formaldehyde/phenol urea extended binders that have high urea extension levels.

BACKGROUND OF THE INVENTION

Polymeric fiberglass binders have a variety of uses ranging from stiffening applications where the binder is applied to woven or non-woven fiberglass sheet goods and cured producing a stiffer product; thermoforming applications wherein the binder resin is applied to sheet or lofty fibrous product following which it is dried and optionally B-staged to form an intermediate by yet curable product; and to fully cured systems such as building insulation, wherein the binder is fully cured to its thermoset state while the fiberglass is in the fully expanded condition, following which the rolls or batts are compressed for storage and shipment.

Fiberglass comes in many shapes and sizes and can be used for a variety of applications. A general discussion of fiberglass manufacturing and technology is contained in *Fiberglass* by J. Gilbert Mohr and William P. Rowe (Van Nostrand Reinhold Company, New York 1978), which is herein incorporated by reference. Fiberglass which is destined for use as insulation, e.g., building, mechanical or the like for thermal or sound attenuation, is often shipped in a compressed form to lower shipping costs. When the compressed bundles of fiberglass are utilized at the job site, it is imperative that the fiberglass product recover a substantial amount of its precompressed thickness. Otherwise, loss of thermal insulation and sound attenuation properties may result.

Traditionally, fiberglass has been treated with phenol/formaldehyde resole binders to achieve the previously discussed recovery from compression. Typically, the binders are applied to the fiberglass from aqueous solution shortly after the fibers have been produced, and cured at elevated temperature in a curing oven. Under the curing conditions, any remaining aqueous solvent is evaporated, and the phenol/formaldehyde resole cures to a thermoset state. The fibers in the resulting fiberglass product are thus partially coated with a thin layer of thermoset resin, which tends to accumulate at the junctions where fibers cross each other. The resulting product therefore not only exhibits higher recovery than a fiberglass product not incorporating a binder, but also suffers from less self-abrasion.

Resins for the fiberglass industry are water soluble; this requirement necessitates high starting formaldehyde to phenol ratios in the resin manufacturing process. Typical formaldehyde to phenol ratios are in the range of 2.5:1 to 3.5:1. The finished phenolic resins used by the fiberglass industry have between approximately 3 and 13 wt % free formaldehyde remaining. This excess of formaldehyde has been taken advantage of by adding urea to the phenol/formaldehyde resole, resulting in a urea-extended resole. The addition of urea to the resins typically occurs 6 to 18 hours before use to form urea/formaldehyde resin in situ in a process known as pre-reaction. This technique reduces the formaldehyde content and significantly lowers the cost of the finished binder. The exact excess of formaldehyde in the phenol/formaldehyde resins that are purchased is dictated by the cost reduction required versus the degradation in binder performance as the urea/formaldehyde content is increased. The latter is based on greater ammonia and particulate emissions as the urea content is increased. Generally, a resin designed to have enough "free" formaldehyde to react with 30 parts by weight of urea per 70 parts of resin solids is seen as being a good compromise for a building insulation product. The binder resulting from this pre-reaction is known as a 70/30 extended binder. For other types of product, such as fiberglass air filter media, much less urea can be tolerated and so resins with formaldehyde contents as low as 3.5 wt % may be used. In the latter cases the extended binders may use resin solids to urea ratios as low as 95/5. Urea pre-reaction consumes much of the formaldehyde but it is thought that an equilibrium amount of between 0.5 and 1 wt % always remains.

Currently, typical fiberglass building insulation processes use resins requiring 30–40 wt % urea extension levels. These levels are established by calculating the formaldehyde to urea molar ratio, which is about 1:1. The molar ratio of free formaldehyde in the resin to urea must be carefully controlled in order to minimize both ammonia and formaldehyde emissions. In many building insulation binders this molar ratio is kept between 0.8 and 1.0. If the ratio drops below 0.8, ammonia emissions increase significantly, likewise if the ratio rises above 1.0, formaldehyde emissions increase significantly. As a result, building insulation resins generally contain between 10 and 12 wt % free formaldehyde. This allows these resins to be reacted with between 30 and 40 wt % urea on a solid weight percent basis. This range of urea extension has been demonstrated to give good performance in terms of the binder resistance to hydrolysis under conditions of high heat and humidity, thereby maintaining product performance in terms of rigidity and recovered thickness. The cost of the phenolic resin in the pre-mix is approximately three times that of the urea. Therefore, using higher extension binders will lower cost. However, it is commonly believed that too much urea results in degradation of product quality. Common commercial phenol/formaldehyde binders are not available with greater than about 12.5 wt % free formaldehyde which limits the urea extension to a maximum of 40 wt % while maintaining the desired formaldehyde to urea molar ratio of from 0.8 to 1.0. Since pre-reaction decreases the cost of the finished binder, it would be beneficial to develop phenolic resins having higher free formaldehyde levels that can be employed to form higher urea extension binders.

SUMMARY OF THE INVENTION

The present invention relates to binders of phenol/formaldehyde resin and urea wherein the resin to urea solids ratio is below 60/40. Employing the inventive binders in the production of fiberglass products reduces manufacturing costs without adversely affecting product performance or increasing formaldehyde or ammonia emissions. Specifically, the invention relates to the use of urea extended phenolic binders with a resin to urea solids ratio below 60/40. The phenolic resins are prepared in a reaction in which the formaldehyde and phenol are initially present in mole ratios of greater than 3.75:1. The use of a high formaldehyde to phenol ratio reduces the cost of the phenol resin and ultimately the extended phenolic binder because formaldehyde is much less expensive than phenol. The high extension level binders are particularly suited for making fiberglass building insulation.

In one aspect, the invention is directed to a method of preparing a binder suitable for treating fiberglass that includes the steps of:

(a) selecting an aqueous resin prepared by reacting phenol with formaldehyde wherein the mole ratio of formaldehyde to phenol is greater than 3.75:1 under alkaline conditions; and (b) adding urea to the aqueous resin in an amount greater than 40 parts per 60 parts of resin solids and reacting to form a urea-extended binder, wherein free phenol present in the urea-extended binder is less than about 1% by weight of urea-extended binder and wherein essentially no ammonia is employed in either step (a) or (b).

In another aspect, the invention is directed to an aqueous phenol/formaldehyde-based binder suitable for applying to fiberglass wherein the binder is prepared by a process that includes the steps of:

(a) selecting an aqueous resin prepared by reacting phenol with formaldehyde wherein the mole ratio of formaldehyde to phenol is greater than 3.75:1 under alkaline conditions; and (b) adding urea to the aqueous resin in an amount greater than 40 parts per 60 parts of resin solids and reacting to form a urea-extended binder, wherein free phenol present in the urea-extended binder is less than about 1% by weight of urea-extended pre-react and wherein essentially no ammonia is employed in either step (a) or (b).

In preparing the phenol/formaldehyde based binder, the molar ratio of free formaldehyde to urea is preferably controlled in order to minimize emissions of ammonia and formaldehyde. Typically this molar ratio is kept between 0.8 and 1.0, therefore, higher free formaldehyde resins may be reacted with a higher percentage of urea to maintain the target formaldehyde to urea molar ratio.

DETAILED DESCRIPTION OF PREFERRED EMBODIMENTS

Figure 1:
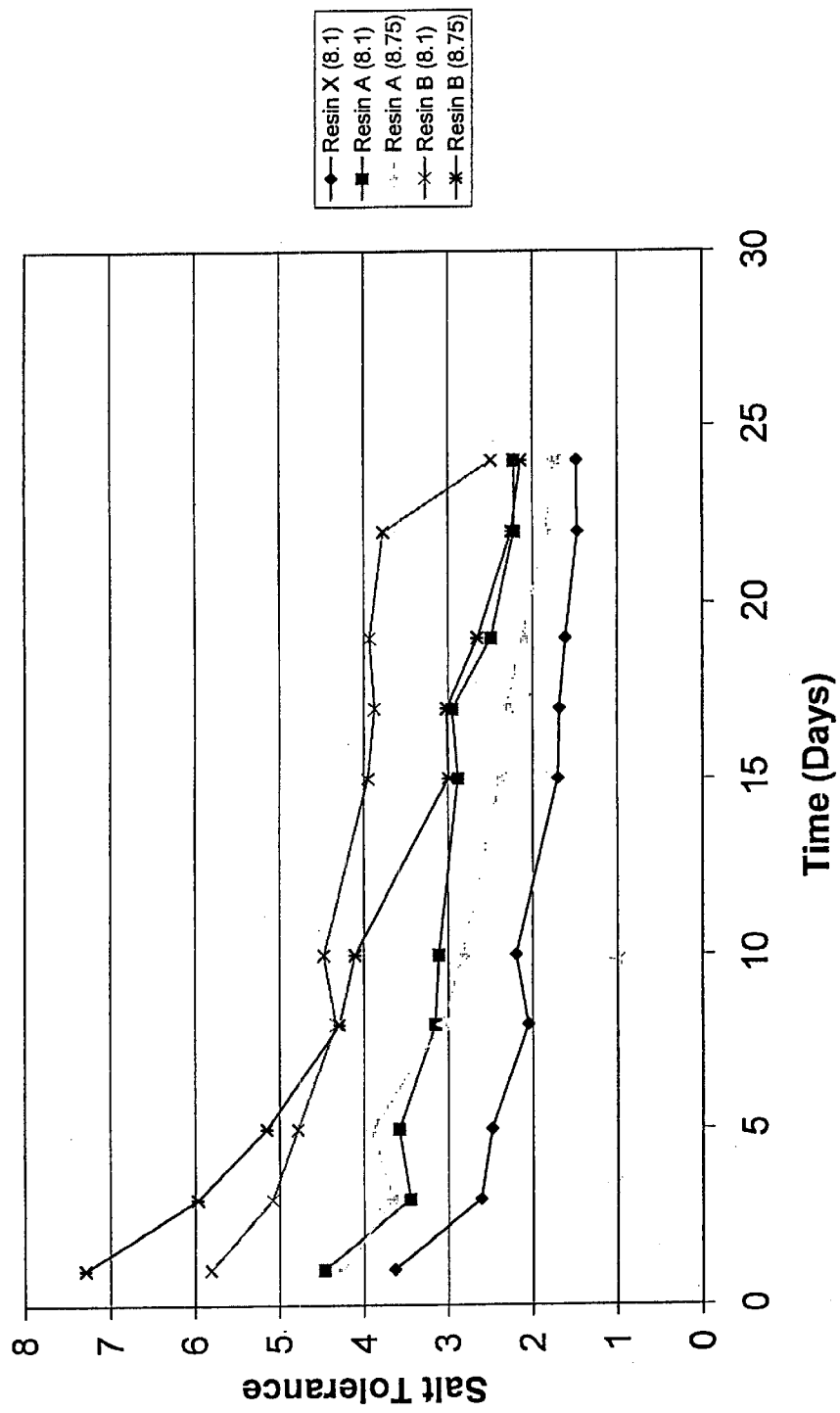
FIGS. 1 and 2 are graphs of salt tolerance and tetradimer concentration vs. time, respectively, for stability testing.

The phenolic resole resins and the formaldehyde/phenol urea extended binders of the present invention can be prepared by conventional methods known in the art but modified to employ higher formaldehyde to phenol molar ratios in the production of the phenolic resole resin. This in turn permits the production of urea extended binders having a resin to urea solids ratio of below 60 to 40. The preparation of resole resins is described, for example, in *The Chemistry of Phenolic Resins* by R. W. Martin (John Wiley & Sons, Inc., New York, 1956).

Typically, the phenolic resole resin is prepared by reacting a molar excess of formaldehyde with phenol under alkaline reaction conditions where the formaldehyde to phenol molar ratio is greater than 3.75 to 1. Preferably the formaldehyde is used in an amount of between about 3.9 and about 5.5 moles per mole of phenol and more preferably the amount is between about 4.0 to 5.0 moles of formaldehyde per mole of phenol.

Alkaline reaction conditions are established by adding an alkaline catalyst to an aqueous solution of the phenol and formaldehyde reactants. During the initial reaction of the phenol and formaldehyde, only that amount of alkaline or base catalyst necessary to produce a resole resin needs to be added to the reaction mixture. Suitable amounts of an alkaline catalyst are known to those skilled in the art. The level of base catalyst used is proportionate to the amount of phenol used in preparing the phenolic resin. Therefore, using less phenol also reduces the amount of base catalyst. Typically, at least about 0.05 mole of alkaline catalyst per mole of phenol is used and preferably between about 0.12 and 0.18 mole of alkaline catalyst per mole of phenol is used.

Alkaline catalysts normally used for preparing phenolic resole resins can also be used in accordance with the present invention. Typical alkaline catalysts include alkali metal hydroxides such as lithium hydroxide, sodium hydroxide and potassium hydroxide; alkali metal carbonates such as sodium carbonate and potassium carbonate; and tertiary amines. A preferred alkaline catalyst is sodium hydroxide. When high catalyst levels are used, the phenolic resins produced may have a higher proportion trimethylol phenol than has been seen previously. These high levels are believed to overcome final performance limitations introduced by the use of high urea extension levels.

The formaldehyde reactant is added to the condensation reaction usually as an aqueous solution containing from about 37 to about 53 wt % or more of formaldehyde. The full complement of the formaldehyde source can be present at the start of the reaction or it can be added incrementally or metered into the reaction mixture during the course of the reaction. The reaction is carried out at a temperature of from about 40° to 70° C. Preferably, the temperature is maintained within the range of about 50° C. to 60° C.

The phenol/formaldehyde reaction product is an aqueous mixture. The volatile content thereof generally ranges from about 50 to about 60 wt %, and is usually no more than about 54 to about 58 wt %. Water may be introduced to the system with the formaldehyde, which is usually added as an aqueous solution, or with the catalyst which is usually added as a preformed aqueous solution.

The phenol/formaldehyde resole resin produced preferably has at least about 10 weight percent of free formaldehyde. Preferably the amount of free formaldehyde ranges from about 12 to 16 wt %. With the present invention, the amount of free formaldehyde contained in excess in the phenol/formaldehyde resin is regulated so that from about 40 to 55 parts by weight, preferably 45 to 50 parts by weight of urea are used for each 100 parts by weight of total pre-react solids. The phenolic resin itself is stable for at least 2 weeks and typically for 4 weeks or more.

The phenolic binder is prepared by initially mixing the aqueous phenol/formaldehyde resole resin with urea followed by adding water to adjust the solids to form a premix. Addition of urea to the aqueous phenol/formaldehyde resole resin will cause an increase in the basicity of the aqueous mixture. Typically the pH will increase from a range of 7.5 to 9.0 to a range of 8.5 to 9.5. In one embodiment, the urea can be added to the aqueous resin after the latter has been neutralized. In a preferred embodiment, the process includes adding a catalyst to the aqueous reaction mixture to cure the phenolic binder. Examples for catalysts include acid catalysts such as salts, preferably ammonium sulfate, ammonium bisulfite, and mixtures thereof. The acid catalyst can be added in an amount from about 2.5 to 8.0 percent by weight of the resole resin and the urea.

In addition to urea, silanes may be incorporated to improve the overall characteristics of the cured product, e.g., fiberglass/binder composition. Suitable silane coupling agents include, for example, A1101 available from OSI, Inc. When a silane coupling agent is employed, it is typically present from 0.10 to 0.50 wt % and preferably 0.15 to 0.30 wt % of the phenolic binder prior to being cured.

As further described herein the phenolic binder can be diluted with water to provide a concentration suitable for application to hot mineral fibers (e.g., glass fibers) or mats. The aqueous phenolic binder can be applied directly to newly formed, still hot glass fibers, and subsequently dried and cured to form the finished product.

The reaction mixture can be agitated to facilitate the process. The phenolic binder that is formed will have a storage stability of at least about 2 days at temperatures up to at least about 30° C.

An important feature of the inventive process is that ammonia is not needed and preferably is not used at any point during the production of the phenolic binder. In addition, the amount of free phenol in the phenolic binder is less than about 1 wt % and preferably is less than about 0.6 wt %.

EXPERIMENTAL

Two phenolic resin formulations having a formaldehyde/phenol molar ratio in accordance with the present invention (A and B) were prepared. The formulations were subsequently tested. Selected specifications of these resins and a commercial resin alkaline resol resin (X), that was used as a control are set forth in Table 1.

TABLE 1

| Resin | X (control) | A | B |
|---|---|---|---|
| F/P Molar Ratio* | 3.75/1 | 5.0/1 | 5.5/1 |
| pH | 8.1 | 8.85 | 8.71 |
| % Solids | 48 | 38 | 35.2 |
| Phenol, % | 0.17 | 0.11 | 0.09 |
| Formaldehyde % | 10 | 16.4 | 18.4 |

*Formaldehyde/phenol molar ratio

Phenolic Resin Stability

Figure 2:
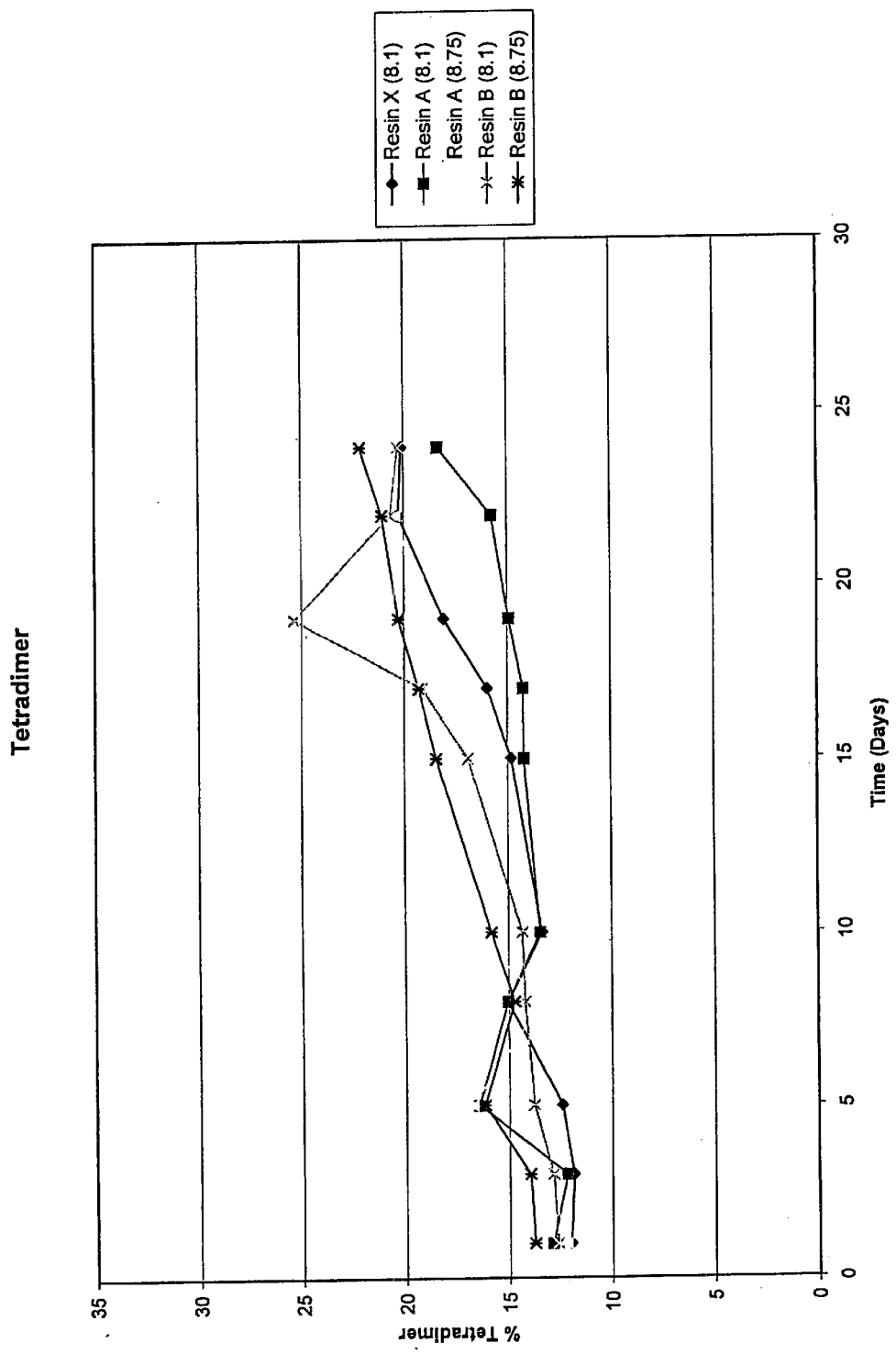

Water tolerance, salt tolerance, and tetradimer analyses were performed using established procedures. Specifically, the resins were reduced to 35% solids and left at room temperature in a closed container for the duration of the study. The A and B resins were tested at both pH 8.75 and 8.1. The resins were tested every Monday, Wednesday and Friday of the week over a period of 24 days until the control resin (i.e., resin X) failed the water tolerance test. Table 2 displays the results of the stability testing. Plots of salt tolerance and percentage tetradimer versus the duration of the study are shown in FIGS. 1 and 2, respectively.

Water tolerance is the weight ratio of distilled water weight to resin weight required to cause precipitation of resin solids.

Salt tolerance is the weight ratio of a 10% NaCl solution to resin required to cause precipitation.

% tetradimer is determined by HPLC.

TABLE 2

| Day | Resin | pH | Water Tolerance | Salt Tolerance | % Tetradimer |
|---|---|---|---|---|---|
| 1 | X | 8.1 | 100 | 3.63 | 11.99 |
|   | A | 8.1 | 100 | 4.46 | 12.88 |

TABLE 2-continued

| Day | Resin | pH | Water Tolerance | Salt Tolerance | % Tetradimer |
|---|---|---|---|---|---|
|   | A | 8.75 | 100 | 4.24 | 12.21 |
|   | B | 8.1 | 100 | 5.81 | 12.63 |
|   | B | 8.75 | 100 | 7.29 | 13.76 |
| 3 | X | 8.1 | 100 | 2.61 | 11.84 |
|   | A | 8.1 | 100 | 3.45 | 12.16 |
|   | A | 8.75 | 100 | 3.65 | 13.14 |
|   | B | 8.1 | 100 | 5.08 | 12.84 |
|   | B | 8.75 | 100 | 5.97 | 13.97 |
| 5 | X | 8.1 | 100 | 2.48 | 12.41 |
|   | A | 8.1 | 100 | 3.58 | 16.44 |
|   | A | 8.75 | 100 | 3.91 | 16.77 |
|   | B | 8.1 | 100 | 4.78 | 13.77 |
|   | B | 8.75 | 100 | 5.15 | 16.17 |
| 8 | X | 8.1 | 100 | 2.05 | 15.02 |
|   | A | 8.1 | 100 | 3.15 | 13.37 |
|   | A | 8.75 | 100 | 3.07 | 14.19 |
|   | B | 8.1 | 100 | 4.33 | 14.7 |
|   | B | 8.75 | 100 | 4.29 | 15.98 |
| 10 | X | 8.1 | 100 | 2.19 | 13.37 |
|   | A | 8.1 | 100 | 3.11 | 13.45 |
|   | A | 8.75 | 100 | 2.82 | 16.63 |
|   | B | 8.1 | 100 | 4.47 | 14.31 |
|   | B | 8.75 | 100 | 4.1 | 15.82 |
| 15 | X | 8.1 | 100 | 1.7 | 14.81 |
|   | A | 8.1 | 100 | 2.88 | 14.2 |
|   | A | 8.75 | 100 | 2.38 | 16.91 |
|   | B | 8.1 | 100 | 3.95 | 16.9 |
|   | B | 8.75 | 100 | 2.99 | 18.44 |
| 17 | X | 8.1 | 100 | 1.68 | 15.97 |
|   | A | 8.1 | 100 | 2.95 | 14.23 |
|   | A | 8.75 | 100 | 2.31 | 17.66 |
|   | B | 8.1 | 100 | 3.87 | 19.12 |
|   | B | 8.75 | 100 | 3.02 | 19.29 |
| 19 | X | 8.1 | 100 | 1.61 | 18.07 |
|   | A | 8.1 | 100 | 2.49 | 14.91 |
|   | A | 8.75 | 100 | 2.12 | 18.82 |
|   | B | 8.1 | 100 | 3.93 | 25.36 |
|   | B | 8.75 | 100 | 2.65 | 20.27 |
| 22 | X | 8.1 | 72.73 | 1.47 | 20.25 |
|   | A | 8.1 | 48.98 | 2.22 | 15.75 |
|   | A | 8.75 | 30.69 | 1.84 | 20.42 |
|   | B | 8.1 | 100 | 3.77 | 20.65 |
|   | B | 8.75 | 100 | 2.25 | 21.05 |
| 24 | X | 8.1 | 45 | 1.48 | 20.11 |
|   | A | 8.1 | 25.74 | 2.22 | 18.33 |
|   | A | 8.75 | 29.41 | 1.74 | 28.7 |
|   | B | 8.1 | 40 | 2.49 | 20.27 |
|   | B | 8.75 | 100 | 2.14 | 22.12 |

The results demonstrate that the stabilities of both the A and B phenolic resins are comparable with that of the control X resin.

Thickness Recovery, Binder Content, and Trimethylamine (TMA) Analysis

Phenolic binders were prepared by reacting the A and B resins with urea to form phenolic binders having a 50/50 or 55/45 solid phenol/formaldehyde resin to solid urea ratios. The resins and urea are mixed and allowed to react for at least 8 hours prior to use. Phenolic binders were also made by reacting three commercial resin alkaline resol products, referred to as X, Y and Z, with urea to produce a 70/30, 70/30, and 60/40 urea extended binders. Specifically, the phenolic pre-reacts were prepared at 35% solids and allowed to react for 16 hours at room temperature. Binders were made up at 20% wt solids and fogged onto 1.5×13×13 inch unbonded fiberglass sheets. The sheets were then cured on a platen press set at 450° F. (232° C.) for 10 minutes. The sheet was then cut into 6×6 inch samples. The initial thicknesses and weights were recorded before the samples were compressed to 25% of original thickness and placed in a humidity cabinet set at 155° F. (68° C.) and 95% relative humidity for 20 hours. The samples were then removed from the cabinet and allowed to cool at room temperature for 30 minutes, released from compression, and allowed to recover in thickness for 1 hour. Thicknesses were then measured and related back to the initial thickness as a percent recovery. Finally, the samples were burned out at 900° F. (482° C.) to determine the loss on ignition (i.e. binder content).

For TMA testing, a sample was fogged as above, but after the samples were cured on the press they were subject to TMA analysis. The recovery, loss on ignition (LOI), and TMA results are reported in Table 3.

TABLE 3

| Resin | Pre-react Extension | F/U* | pH | TMA, ug/g | % Recovery (20 hr) |
|---|---|---|---|---|---|
| Control X | 70/30 | 0.97 | 8.1 | 18 | — |
| Control Y | 70/30 | 0.97 | 8.75 | 15 | — |
| Control Z | 60/40 | 0.78 | 8.75 | 20 | 84.4 |
| A | 50/50 | 0.86 | 8.75 | 18 | 82.95 |
| A | 50/50 | 0.86 | 8.1 | 23 | — |
| B | 50/50 | 1.05 | 8.75 | 41 | 82.12 |
| B | 50/50 | 1.05 | 8.1 | 44 | — |
| A | 55/45 | 1.06 | 8.75 | 25 | 83.82 |
| B | 55/45 | 1.28 | 8.75 | 45 | — |

*Free formaldehyde to urea molar ratio

The recovery testing of binders formulated with 50/50 and 55/45 pre-reacts demonstrate that the inventive binders recover as well as a binder formulated from a 60/40 pre-react made from resin Z.

Trimethylamine is a reaction by-product of formaldehyde and urea; TMA has an unpleasant fishy odor. The concentration of urea in the pre-react, pH of the resin, and formaldehyde to urea ratio are important factors maintaining the amount of TMA in the final product to an acceptable level.

Pre-reaction is employed to extend the phenolic resin by reacting urea with the free formaldehyde. With the present invention, the pre-reaction effectively reduces the amount of free formaldehyde to less than 1 wt %. Therefore, the higher the concentration of free formaldehyde in the phenolic resin starting material the higher the amount of urea needed to reduce the level of free formaldehyde in the phenolic binder or pre-react to the desired level of less than 1 wt %. The use of high urea concentration increases the probability of forming TMA.

The 50/50 extended pre-reacts may potentially produce more TMA due to the amounts of urea and formaldehyde present, but, when the formaldehyde to urea molar ratio of these pre-reacts is kept below 1, the amount of TMA can be kept to an acceptable level.

It is believed that too much urea in the binder can have negative effects on the final product performance, such as product recovery. Since urea reacts with formaldehyde to produce a urea/formaldehyde resin in-situ, this complex is susceptible to moisture that can hinder final product recovery. But as shown in Table 3 recovery testing of binders formulated with 50/50 and 55/45 pre-reacts demonstrate that the inventive binders recover as well as a binder formulated from a 60/40 pre-react.

Production Testing

Urea-extended phenolic binders derived from phenolic resin A and other commercial resins (namely resins R and S) employed to fabricate R-19 building insulation products, which were tested for recovered thickness. Loss on ignition was maintained at 7% throughout the test.

As a control, R-19 product was also made using a standard commercial alkaline phenol/formaldehyde resin (S) and a urea solution such that the resin to urea ratio was 60/40 on a solids basis. After the normal pre-react time of around 12 hours, the approximately 44% solids solution was in-line mixed with a solution containing an acid catalyst, a silane, and water. These components were then delivered to sets of spraying nozzles where they were dispersed. The final solids content of the binders as sprayed was around 14%. The nozzles were arranged in six circles spraying the binders towards the center of the fiberglass from a distance of about 8 inches. The fiberglass was manufactured using standard fiberglass spinning units located approximately 12 inches above each circle of nozzles. The fiberglass production and binder spray rates were kept constant such that the final cured binder content represented about 7 wt % of the finished product. Approximately 0.2% of the cured binder content represented the silane, and 6% represented a latent acid catalyst.

The control resin S binder was prepared by reacting formaldehyde with phenol at a molar ratio of approximately 3.6 to 1. This phenolic resin had approximately 12% free formaldehyde and 1.0% free phenol.

The phenolic resin A was prepared with a formaldehyde to phenol ratio of 5:1. The resin contained 0.14 wt % free phenol and 18% free formaldehyde which allows pre-reaction with 50% urea solids (at a 1.0 formaldehyde to urea molar ratio).

Resin R was prepared such that it contained 0.4 wt % free phenol and 13.8 wt % free formaldehyde. This resin was run at both 40% and 48% urea extension. Both of these binders showed equivalent recovery to the control out to two months.

Each of the phenolic resins was pre-mixed with urea to yield a free formaldehyde to urea molar ratio of between 0.7 and 1.0, then allowed to react for a minimum of 12 hours.

Selected properties of the phenolic resin are shown in Table 4. All resins had a pH of approximately 8.75 and were premixed with urea in 300 gallon totes for a minimum of 12 hours prior to use.

TABLE 4

| Resin | % Solids | Specific Gravity | % Free Formaldehyde | % Free Phenol |
|---|---|---|---|---|
| S | 45.25 | 1.190 | 11.3 | 0.69 |
| R | 43.12 | 1.210 | 13.8 | 0.38 |
| A | 37.74 | 1.190 | 18.2 | 0.14 |

R-19 products were also tested for trimethylamine, density, and LOI. The results are set forth in Table 5.

TABLE 5

| Binder | Density | % LOI | TMA (ppm) |
|---|---|---|---|
| S (60/40) | 828.1 | 7.0 | 47 |
| S (60/40) | 557 | 6.4 | 50 |
| R (52/48) | 830.9 | 7.0 | 31 |
| R (60/40) | 832.6 | 6.0 | 75 |
| A (50/50) | 563.7 | 6.2 | 47 |

Figure 3:
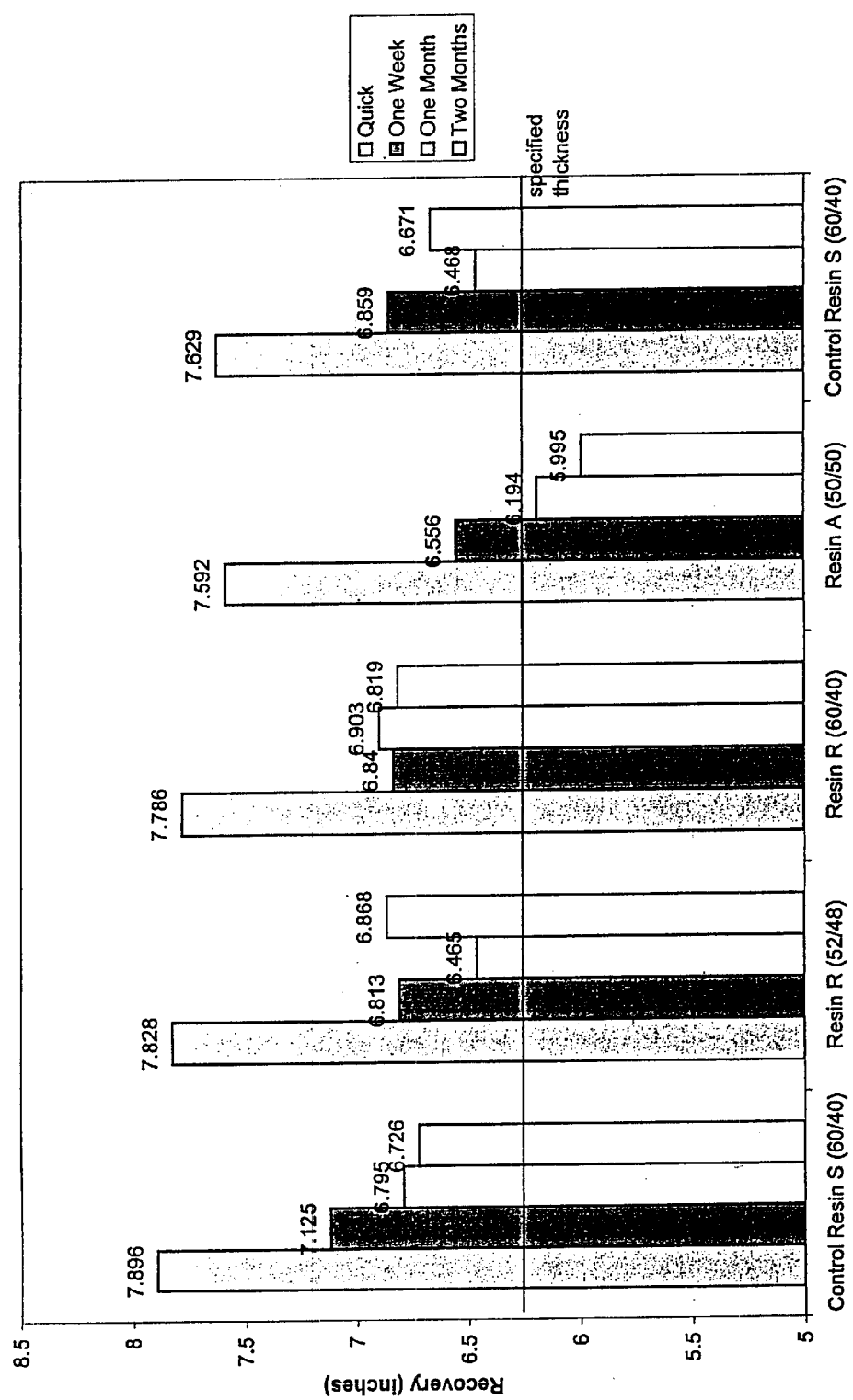
FIG. 3 is a graph of product recovery data.

Recovery results from quick (i.e., day one), one week, one month, and two month testing are shown graphically in FIG. 3. Two month testing revealed some degradation in product performance with the use of resin A at 50% urea extension. The data also indicate equivalent product recovery between binder R at 48% urea extension and the control binder S at 40% urea extension (at a 95% confidence limit). Binder systems designed for 50% urea extension exhibit lower recovery than the control S binder at 40% urea extension.

The binder made from resin R exhibited equivalent two month recovery at urea extensions as high as 48%. This binder should result in a significant cost savings as well as possibly reducing plant-wide emissions of particulate, VOCs, and phenol.

Although only preferred embodiments of the invention are specifically disclosed and described above, it will be appreciated that many modifications and variations of the present invention are possible in light of the above teachings and within the purview of the appended claims without departing from the spirit and intended scope of the invention.

What is claimed is:

1. A method of preparing a binder suitable for treating fiberglass comprising:
   (a) selecting an aqueous resin prepared by reacting phenol with formaldehyde wherein the mole ratio of formaldehyde to phenol is greater than 3.75:1 under alkaline conditions, and the aqueous resin contains about 10% to 16% free formaldehyde;
   (b) adding urea to the aqueous resin in an amount greater than 40 parts per 100 parts of resin solids and reacting to form a urea-extended phenolic binder, wherein free phenol present in the urea-extended phenolic binder is less than about 1% by weight of urea-extended phenolic binder and wherein essentially no ammonia is employed in either step (a) or (b).

2. The method of claim 1 wherein in step (a) the aqueous resin formed following the reaction between phenol and formaldehyde contains about 12% to 16% free formaldehyde.

3. The method of claim 1 wherein the mole ratio of formaldehyde to phenol is between about 3.9:1 and 5.5:1.

4. The method of claim 1 wherein the mole ratio of formaldehyde to phenol is between 4.0:1 and 5.0:1.

5. The method of claim 1 wherein step (b) comprises adding sufficient urea so that the amount of urea present is in an amount ranging from 45 to 50 parts by weight of resin per 100 parts of total pre-react solids.

6. The method of claim 1 wherein the free phenol present in the urea-extended pre-react is less than about 0.6% by weight of the urea-extended pre-react.

7. The method of claim 1 wherein in step a the aqueous resin is prepared by reacting phenol with formaldehyde in the presence of an alkaline catalyst.

8. The method of claim 1 wherein in step b the reaction between urea and aqueous resin is catalyzed by an acid catalyst.

9. The method of claim 1 wherein the urea-extended binder is stable for at least 2 days.

10. An aqueous phenol/formaldehyde-based binder suitable for applying to fiberglass wherein the binder is prepared by a process that comprises the steps of:
    (a) selecting an aqueous resin prepared by reacting phenol with formaldehyde wherein the mole ratio of formaldehyde to phenol is greater than 3.75:1 under alkaline conditions, and the aqueous resin contains about 10% to 16% free formaldehyde;
    (b) adding urea to the aqueous resin in an amount greater than 40 parts per 100 parts of resin solids and reacting to form a urea-extended phenolic binder, wherein free phenol present in the urea-extended phenolic binder is less than about 1% by weight of urea-extended phenolic binder and wherein essentially no ammonia is employed in either step a or b.

11. An alkaline phenol/formaldehyde-based binder suitable for applying to fiberglass to form a binder-coated fiberglass product, said binder comprising:
    (a) a phenol/formaldehyde resin containing excess, unreacted formaldehyde, wherein the mole ratio of formaldehyde to phenol is greater than about 3.75:1, and the aqueous resin contains about 10% to 16% free formaldehyde;
    (b) urea in an amount greater than 40 parts per 100 parts of phenol/formaldehyde resin solids, wherein free phenol comprises less than about 1% by weight of the binder, wherein essentially no ammonia is present in the binder, and wherein the binder is stable for at least 4 weeks.

* * * * *